(12) United States Patent
Sachtleben et al.

(10) Patent No.: US 8,005,353 B2
(45) Date of Patent: Aug. 23, 2011

(54) FLOW-THROUGH HEATER

(75) Inventors: Andreas Sachtleben, Minden (DE); Yat Chuen Wong, Hong Kong (CN)

(73) Assignee: Melitta Haushaltsprodukte GmbH & Co. KG, Minden (DE)

( * ) Notice: Subject to any disclaimer, the term of this patent is extended or adjusted under 35 U.S.C. 154(b) by 762 days.

(21) Appl. No.: 12/071,918

(22) Filed: Feb. 27, 2008

(65) Prior Publication Data

US 2008/0212954 A1 Sep. 4, 2008

(30) Foreign Application Priority Data

Feb. 27, 2007 (DE) ................... 20 2007 002 963 U

(51) Int. Cl.
*F24H 1/10* (2006.01)
*A47J 31/00* (2006.01)

(52) U.S. Cl. ........................................ 392/479; 392/465
(58) Field of Classification Search .......... 392/465–496
See application file for complete search history.

(56) References Cited

U.S. PATENT DOCUMENTS

| 2,954,826 | A | * | 10/1960 | Sievers | ............... 166/60 |
| 4,325,293 | A | * | 4/1982 | Bleckmann | ............... 99/300 |
| 4,340,354 | A | * | 7/1982 | Schwarz | ............... 431/12 |
| 4,825,042 | A | * | 4/1989 | Hauslein | ............... 392/467 |
| 5,960,160 | A | * | 9/1999 | Clark et al. | ............... 392/481 |
| 2010/0092164 | A1 | * | 4/2010 | Ziehm | ............... 392/485 |

* cited by examiner

*Primary Examiner* — Daniel Robinson
(74) *Attorney, Agent, or Firm* — Venable LLP; Robert Kinberg; Leigh D. Thelen

(57) ABSTRACT

A flow-through heater includes a heating element and a liquid-bearing tube connected to the heating element. The liquid-bearing tube has a flat area on which a thermostat is mounted.

7 Claims, 2 Drawing Sheets

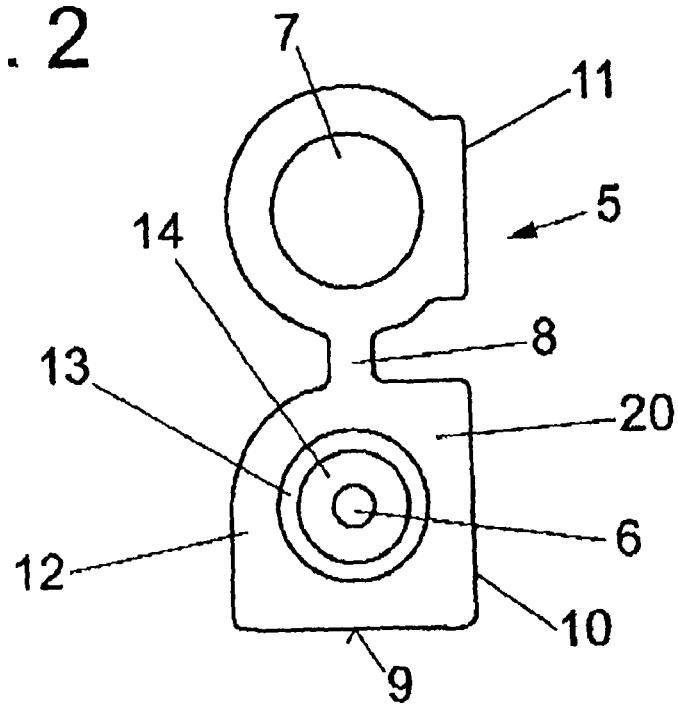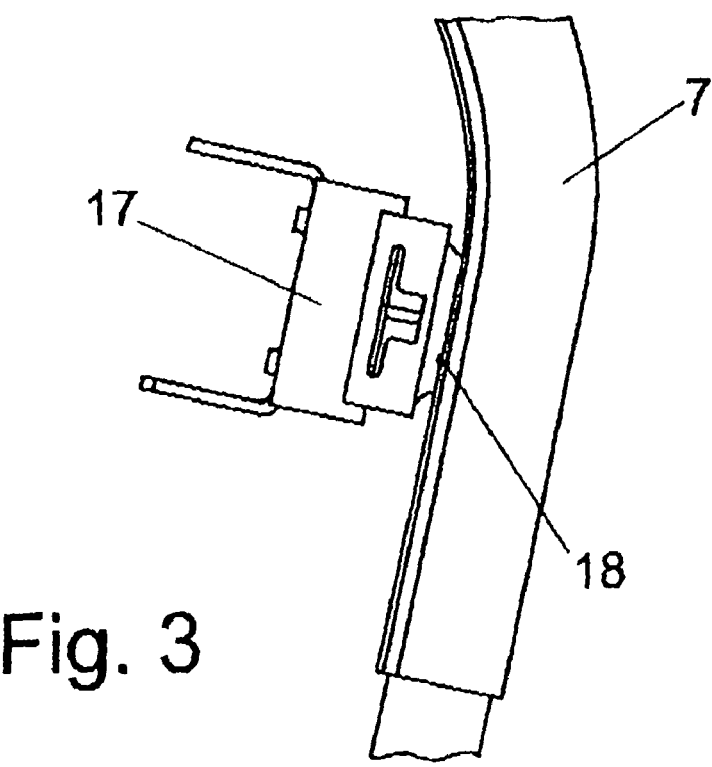

FLOW-THROUGH HEATER

CROSS-REFERENCE TO RELATED APPLICATION

This application claims the priority of German Patent Application No. 20 2007 002 963.2 filed on Feb. 27, 2007, the subject matter of which is incorporated herein by reference.

BACKGROUND OF THE INVENTION

The invention relates to a flow-through or continuous-flow heater, used in particular for coffee machines. Such a heater includes a liquid-bearing tube of a heat-conducting material which is connected to a heating element.

Flow-through water heaters for coffee machines are known, for which the brewing water inside a heating tube is heated with the aid of a tubular heating element, arranged adjacent thereto, and is then released in the heated state via a spray nozzle. To avoid overheating, a thermostat with a contact disk is attached to the heating tube, wherein a bracket is either welded on or press fitted to the heating tube to obtain a sufficiently flat connection with the contact disk. This additional operational step of welding on or press-fitting to the bracket is not only expensive, but also results in or creates insufficiently flat contact areas. Further, the known flow-through heaters have a limited capacity for storing energy.

SUMMARY OF THE INVENTION

It is therefore an object of the present invention to create a flow-through heater which is easy to produce and makes optimum use of heat energy.

The above and other objects are accomplished according to the invention by the provision of a flow-through heater, which in one embodiment includes: a heating element; a liquid-bearing tube connected to the heating element, the liquid-bearing tube having a flat area; and a thermostat mounted on the flat area of the liquid-bearing tube.

Accordingly, in the above embodiment of the invention, the liquid-bearing tube has a flat area on which a thermostat is mounted. As a result, the flow-through heater can be installed without the installation step of press-fitting the heating tube, since the flat surface is already formed-on during the production, for example during the process of extruding the tube.

According to a further embodiment, the flat area is arranged on an inside region of the bow-shaped, curved flow-through heater. The thermostat is also arranged on the inside of the curve, thereby ensuring a compact design.

The flat area on the liquid-bearing tube may be formed by two material enlargements forming corner regions, which are then available as additional energy storage areas. The liquid-bearing tube, which may be arranged adjacent to the flat area and the material enlargements, may be embodied with a generally ring-shaped cross section and uniform wall thickness, so that the tube remains flexible and the material expenditure is limited.

According to another embodiment of the invention, the liquid-bearing tube and the housing for the heating element are linked by a connecting web to ensure good conductivity. The liquid-bearing tube and the housing for the heating element can thus be produced integrally of a metal, preferably an extruded aluminum profile, which makes possible an especially easy installation of the unit consisting of the heating element and liquid-bearing tube.

In a further embodiment according to the invention, a material enlargement is provided as an energy store on the heating element for the flow-through heater, on the side facing the fluid-bearing tube. As a result, the heating intervals of the heating element can be extended, which prolongs the service life.

The material enlargement advantageously forms a flat area on one side of the heating element, which extends parallel to a flat area on the liquid-bearing tube with the thermostat. In particular, the two flat areas may be arranged in a joint plane.

BRIEF DESCRIPTION OF THE DRAWINGS

These and other features and advantages of the invention will be further understood from the following detailed description, with reference to the accompanying drawings.

FIG. 2 shows a sectional view of a detail of the heating element and the liquid-bearing tube.

FIG. 3 shows a view of a detail showing the thermostat on the liquid-bearing tube.

DETAILED DESCRIPTION

Figure 1:
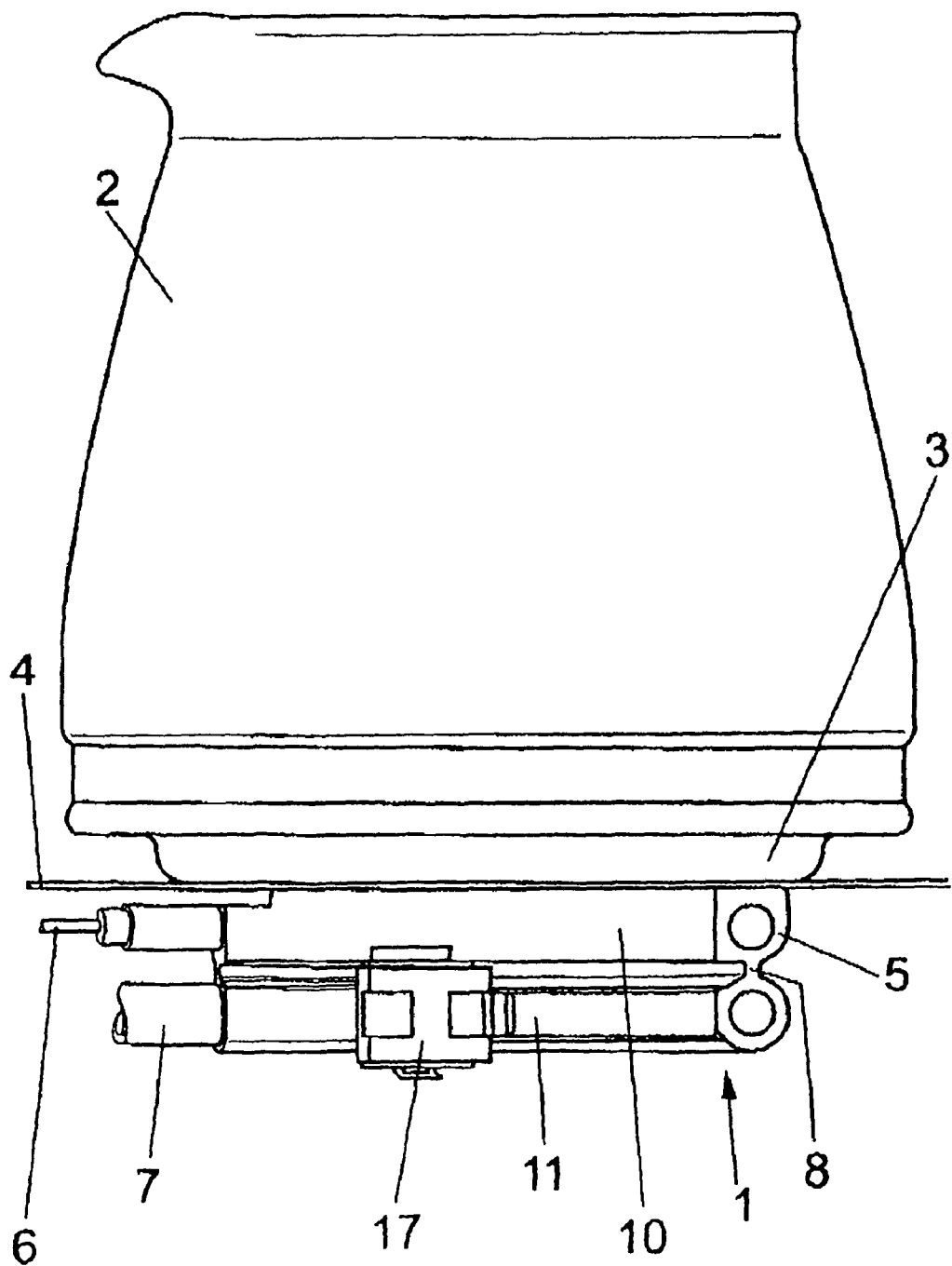
FIG. 1 shows a side view of a flow-through heater according to the invention, in an assembled state.

Referring to FIG. 1, there is shown a flow-through heater 1 for a carafe 2 for keeping a brewed beverage warm, especially coffee, wherein this carafe rests with its bottom 3 on a heating plate 4. Arranged underneath the heating plate 4 is a body 5, comprising a heating element 6 and a liquid-bearing tube 7, which are connected to each other via an integrally formed connecting web 8. The body 5 serves as heat conductor and energy store, so that the heating plate 4 is heated up at the same time as the heating element 6, which heats up the water inside the liquid-bearing tube 7. The body 5 in this case takes the shape of a horseshoe and is arranged at least in the region below the heating plate 4, wherein the body 5 can also have a meandering shape.

The body 5 is formed with an extruded aluminum profile, which is initially produced as a straight profile and is then bent into shape.

FIG. 2 represents a cross section through the body 5. The heating element 6 consists of an electric resistance wire that is enclosed by an insulating material 14 and a sleeve 13, preferably a copper tube. Heat is released via the heating element 6 to a housing 12, formed by the body 5.

A flat area 9, against which the heating plate 4 rests, is embodied on the side of the heating element 6 that is facing away the liquid-bearing tube 7.

A material enlargement 20 is furthermore provided as an energy store on the heating element 6, on the side facing the liquid-bearing tube 7. The material enlargement 20 forms a flat area 10 on an inside region of the body 5.

Body 5 includes another flat area 11 adjacent to the liquid-bearing tube 7. A thermostat 17 is mounted on flat area 11 via a flat disk 18 (see FIG. 3). Once the heating element 6 is heated up, the body 5 warms up and heat energy is conducted via a connecting web 8 to the liquid-bearing tube 7. If the liquid-bearing tube 7 does not contain any water for cooling, then steps must be taken to prevent a further heating up of the flow-through heater. This is achieved with the thermostat 17, which contains a bimetallic element that is automatically deformed mechanically upon reaching a specific temperature, which results in disconnecting the electric circuit. The heating element 6 is therefore turned off once a specific temperature is reached, until the bimetallic element has regained its original shape, following a cooling down.

For the embodiment shown herein, the heating element 6 is arranged between the heating plate 4 and the liquid-bearing tube 7. Of course, the heating element 6 and the tube 7 can also be arranged horizontally side-by-side instead of vertically one above the other.

The heating element 6 includes a material enlargement 20 arranged adjacent to the liquid-bearing tube 7 that serves as supplementary heat store or heat reservoir. It is also possible to provide several material enlargements, for example in the form of ribs, on the housing 20 for the heating element 6.

It will be understood that the above description of the present invention is susceptible to various modifications, changes and adaptations, and that the same are intended to be comprehended within the meaning and range of equivalents of the appended claims.

What is claimed is:

1. A flow-through heater, comprising:
    a body having a first portion, a second portion defining a liquid-bearing tube, and a connecting web to connect the first and second portions, wherein the liquid-bearing tube has a flat area;
    a heating element embedded in the first portion of the body; and
    a thermostat mounted on the flat area of the liquid-bearing tube,
    wherein the first portion of the body includes a material enlargement constituting an energy store on a side facing the liquid-bearing tube.

2. The flow-through heater according to claim 1, wherein flow-through heater has a curved shape and the flat area is located on an inside area of the curved shaped flow-heater.

3. The flow-through heater according to claim 1, wherein the liquid-bearing tube has a generally ring-shaped cross section with a uniform wall thickness and including two material enlargements comprising corner regions defining the flat area, the liquid-bearing tube being arranged adjacent to the flat area and the material enlargements.

4. The flow-through heater according to claim 1, wherein the first portion, the liquid-bearing tube and the connecting web comprise an integral metal body.

5. The flow-through heater according to claim 4, wherein the integral metal body comprises aluminum.

6. The flow-through heater according to claim 1, wherein the material enlargement includes a flat area which extends parallel to the flat area on the liquid-bearing tube on which the thermostat is mounted.

7. The flow-through heater according to claim 6 wherein the flat area resulting from the material enlargement on the first portion and the flat area on the liquid-bearing tube, on which the thermostat is mounted, are arranged in a single plane.

* * * * *